Feb. 12, 1963 W. A. BURTIS 3,077,332
BUTTERFLY VALVE HAVING RADIALLY SHIFTABLE AND
FLUID PRESSURE RESPONSIVE SEAT
Filed Feb. 15, 1960 3 Sheets-Sheet 2
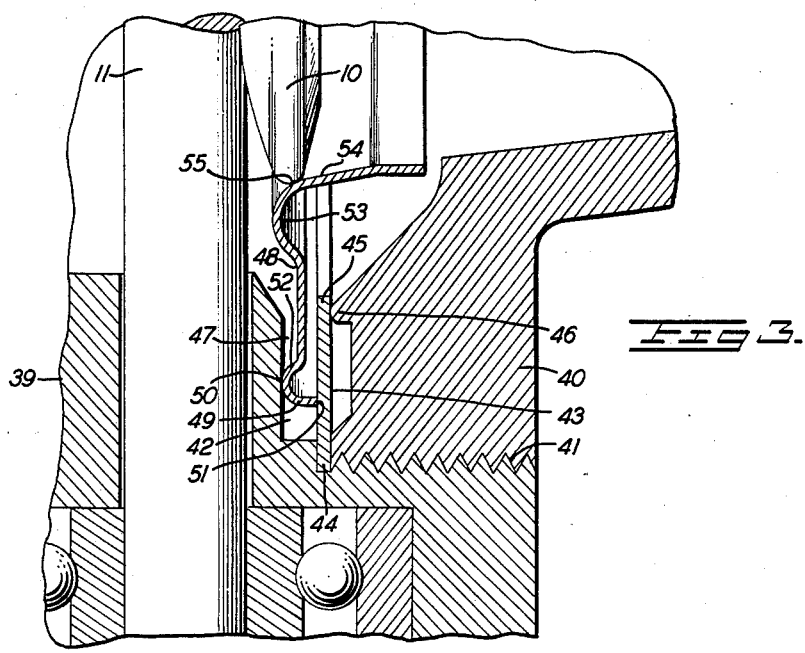
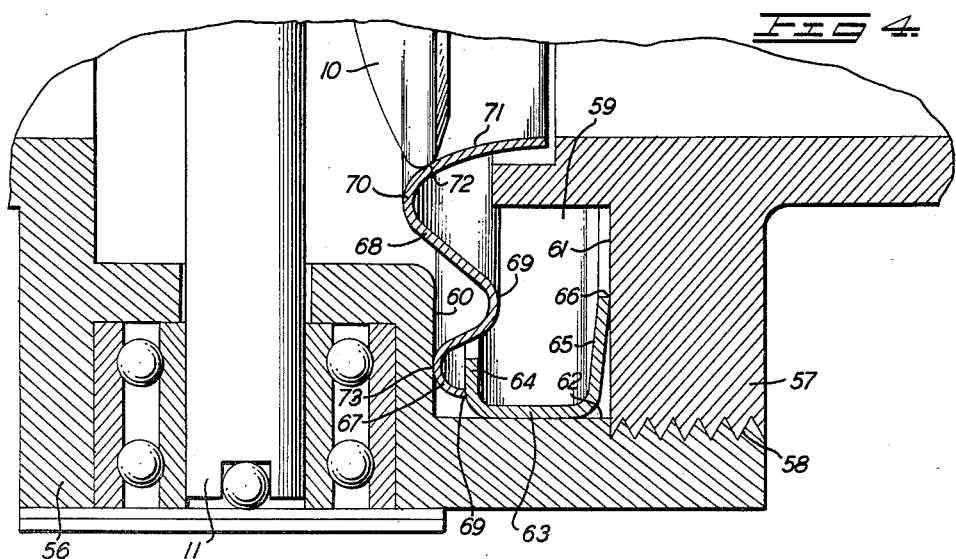
INVENTOR
WILSON A. BURTIS
BY *Harmon & King*
ATTORNEY

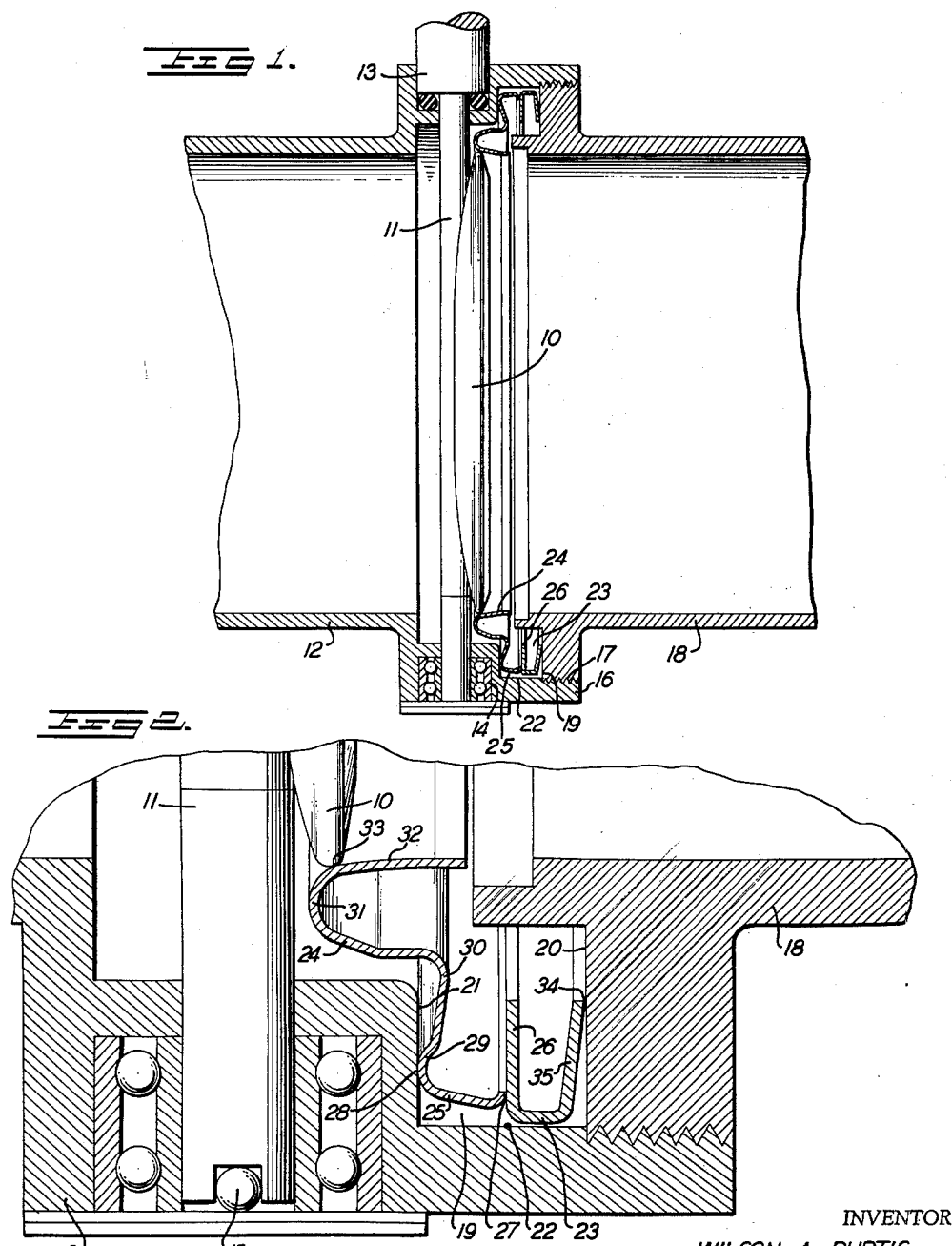

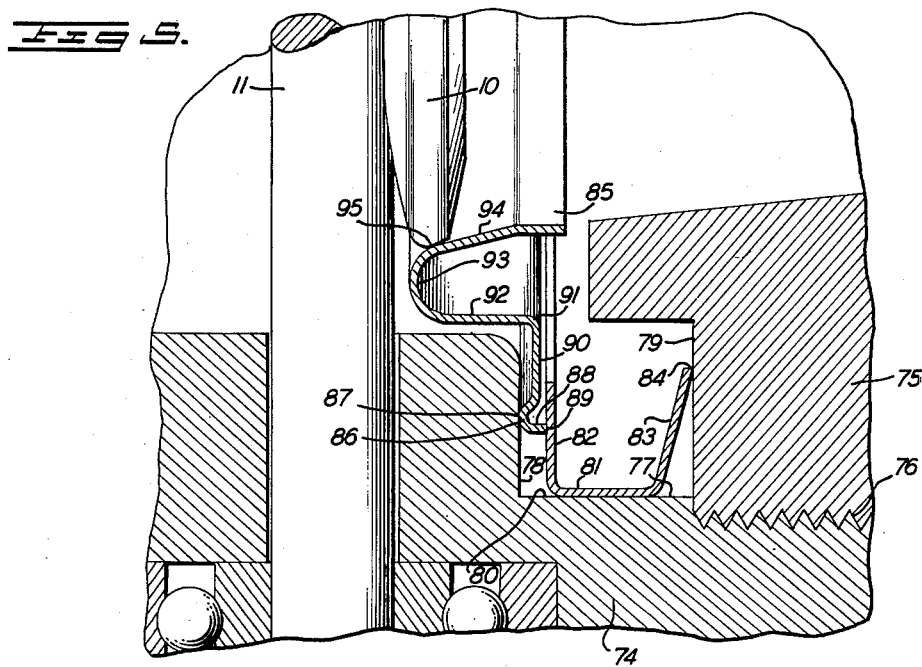
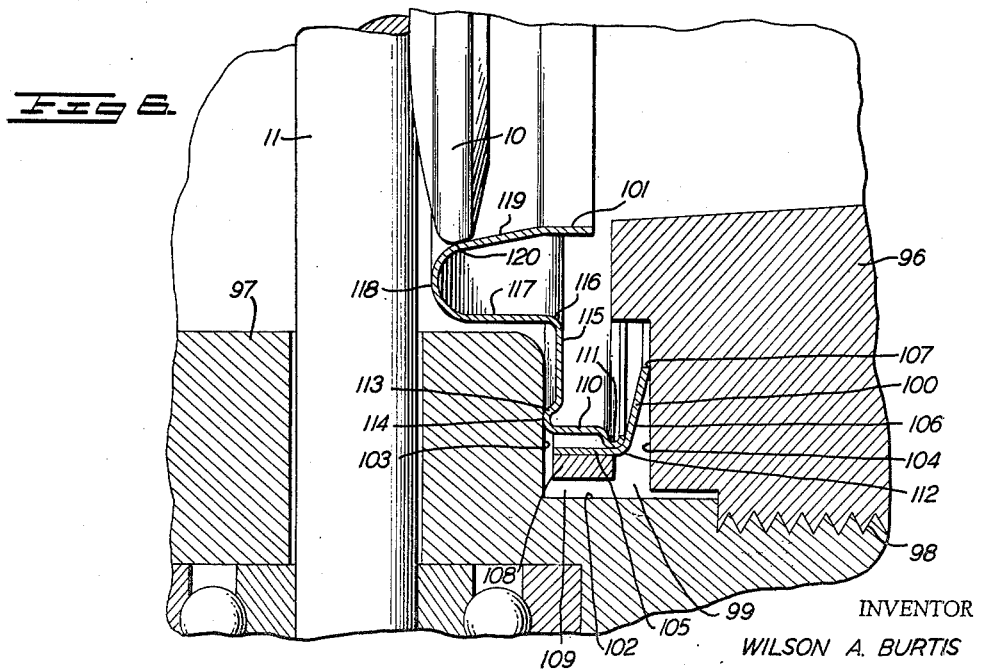

United States Patent Office 3,077,332
Patented Feb. 12, 1963

3,077,332
BUTTERFLY VALVE HAVING RADIALLY SHIFTABLE AND FLUID PRESSURE RESPONSIVE SEAT
Wilson A. Burtis, Los Angeles, Calif., assignor to Aero-Flow Dynamics, Inc., a corporation of New York
Filed July 15, 1960, Ser. No. 43,221
8 Claims. (Cl. 251—173)

This invention relates generally to valve structures and more particularly to improvements in butterfly valves.

The primary object of this invention is to provide an improved metal to metal seal between a butterfly valve disc and a valve seat.

A more specific object of this invention is to provide a valve structure of the butterfly type wherein a seat for the valve disc is rendered both shiftable and pressure responsive to obtain an efficient seal between the disc and the seat in a valve closed position.

Another object of this invention is to provide an improved and efficient valve seat for butterfly valves.

A further object of this invention is to provide an improved valve seat assembly for butterfly valves.

Another object of this invention is to provide a valve seat assembly for butterfly valves wherein the seat structure is resiliently loaded to compensate for temperature changes which cause varying degrees of expansion of the valve parts.

Another object of this invention is to provide a seat assembly for butterfly valves including a pair of coacting metal elements operating cooperatively to obtain an efficient seal with a butterfly valve disc while maintaining an efficient seal with the valve body.

A further object of this invention is to provide an improved two part valve seat structure for butterfly valves.

A still further object of this invention is to provide a butterfly valve structure without sealing gaskets and where a strictly metal-to-metal seal of two part construction including a shiftable valve seat and a resilient seat loading structure is utilized between the valve body and the valve disc to maintain an efficient seal.

With the foregoing and other objects in view this invention resides in the following specification and appended claims, certain embodiments and details of construction being illustrated in the accompanying drawings in which:

FIGURE 1 is a fragmentary, partially sectioned view of the butterfly valve comprising this invention;

FIGURE 2 is an enlarged, fragmentary view of the lower portion of FIGURE 1 illustrating in section the valve seat for the butterfly valve of this invention;

FIGURE 3 is a fragmentary, partially sectioned view of a modified form of seat construction for the valve of FIGURE 1;

FIGURE 4 is a fragmentary, partially sectioned view of still another modified form of valve seat for the valve of FIGURE 1;

FIGURE 5 is a view similar to FIGURES 2-4 of another modified form of seat construction for the valve of FIGURE 1; and FIGURE 6 is a view similar to FIGURES 2-5 illustrating yet another form of the invention.

Referring now more particularly to the drawings and with specific regard to FIGURES 1 and 2, a butterfly valve disc 10 is illustrated as being secured by means not shown to an operating shaft 11. The shaft 11 extends outwardly in opposite directions through a valve body member 12. The shaft 11 is supported in the body member 12 by a plane bearing surface 13 at one end and a ball bearing assembly 14 at the lower end as viewed in FIGURE 1.

In FIGURE 2 the bearing assembly 14 is further provided with a lower thrust ball bearing 15 on which the shaft 11 may rotate. The valve disc 10 is secured to the shaft 11 in an offset manner as is fully described in my co-pending application Serial No. 812,258, filed May 11, 1959, entitled Butterfly Valve.

The body member 12 is provided with an offset integral sleeve extension portion 16 having internal threads 17 to threadably engage and receive a second body portion 18 of the valve assembly. Upon full engagement of the body members 12 and 18 at the threads 17 a cavity 19 is created between the terminal wall sections 20 and 21 thereof. The interior surface of the body portion 12 between the walls 21 and 20 provides a bottom wall 22 for the recess 19. As viewed in FIGURES 1 and 2 there is disposed in the recess 19 a backing ring 23 of substantially U-shaped cross section. The ring 23 has an external diameter somewhat less than the internal diameter of the body portion 12 at the wall 22 of the recess 19 whereby the ring 23 is capable of shifting radially within the recess. The ring 23 is preferably composed of a corrosion resistant metal and is inherently resilient whereby to cooperate with a seat element to form a leak free valve seat assembly as will be hereinafter described.

Also positioned within the recess 19 is a resilient metal valve seat 24 having a lower wall portion 25 which extends between the wall 21 of the member 12 and the vertical wall 26 of the backing ring 23. At the point of sealing contact with the wall 26 the seat wall 25 is turned upwardly in an arcuate fashion at 27 whereby the engagement thereof with the wall 26 is substantially tangential in character. As viewed in FIGURE 2 the other terminus of the seat bottom wall 25 is an arcuate section 29 engaging the wall 21 at a fulcrum point 28. The arcuate section 29 of the seat 24 is joined with a substantially upright portion 30 which is directed upwardly, then axially downstream of the valve and thence is reversed upon itself into an opposed axial direction about a looped portion 31 to provide a resilient seat engaging portion 32 for the valve disc 10 in an opposed direction to the pressure fluid flow through the valve assembly.

In the form illustrated in FIGURES 1 and 2 the dimensions and the type and gauge of material used for the valve seat 24 and the backing ring 23 are such that the ring 23 will place the lower wall 25 of the seat 24 under a certain pre-selected amount of spring bias. This bias is sufficient to aid in sealing the valve but is not so great as to prevent the desirable radial shifting characteristics of the seal member 24 during a closing operation of the valve disc 10 as will be described.

In the operation of the preferred form illustrated in FIGURE 2, it will be noted that the valve disc 10 is illustrated as being in contact with the portion 32 of seat 24 at the point 33 which is a point on the curve created by the reversely curved or looped section 31 and, in effect, is a point of a tangential engagement between the parts 10 and 24. The valve in this position is sealed tightly against fluid under pressure coming from the right as viewed in FIGURE 2. The sealing points include the contact point 33 between the members 10 and 24, the point contact 28 between the arcuate section 29 of seat 24 and the wall 21 of the body 12, the tangential contact between the curved section 27 of the seat 24 and the vertical wall 26 of the backing ring 23, and the contact point 34 between the angularly inclined wall 35 of ring 23 and the recess wall 20 of body section 18. The pressure of the fluid acting in the recess 19 will tend to pivot the member 24 about the fulcrum point 28 and form a pressure actuated seal between the section 32 of the seat 24 and the peripheral edge of the valve disc 10. The reason for the construction of the seal in the manner illustrated is to insure a constant round shape of the section 32 that will completely minimize possible seating errors due to distortion under temperature variations. It has been noted above that the seal 24 is relatively free to float or move radially within the recess 19 of the housing. This is a provision of this invention to compensate for the impracticability of controlling non-symmetrical expansion and contraction of the parts due to temperature changes within and about the valve housing, and inconsistencies in symmetrical shapes of the parts and the formations of materials produced by general manufacturing methods. Such manufacturing difficulties are ignored by the present invention, while allowing the seal to retain its shape to match with the butterfly which is also of a symmetrical section. Since the butterfly disc 10 contacts the seal 24 at the tangent point 38 of the radius of the arcuate section 31, any binding of the seal and butterfly due to differential temperatures between the two is prevented. If there is a temperature differential between the parts, the butterfly disc 10 will move around the radius of the loop 31 slightly and the point contact 33 will be varied. The seat 24 also makes up for wear, due to the tangential sealing surface 32 being deflected forwardly by differential pressure loads when the valve is closed. Seat 24 is also protected from dynamic fluid velocity loads, since it is of the same or greater diameter than the internal diameter of the housing. In other words, wide temperature variations to which the valve assembly may be subjected, and which may have varied effects on the body portions 12 and 18 and upon the disc 10 and seat 24, will be compensated for by the construction illustrated to the point that they will have a negative effect upon the sealing characteristics of the seat 24 under pressure conditions.

Referring now to the modified form of the invention illustrated in FIGURE 3 it will be noted that the valve disc 10 carried by the shaft 11 is housed by body portions 39 and 40. Upon full threaded engagement along the threads 41 of the two housing members 39 and 40, a body recess 42 is created. Extending radially of the recess 42 is a backing plate 43 of resilient and preferably non-corrosive metal material. The end portion 44 of the backing ring 43 is illustrated as being clamped between the opposing surfaces of the body members 39 and 40. The upper portion 45 of the ring 43 is engaged upon an inwardly directed boss 46 which slightly over-extends the recess 42 to provide a bearing point for the extremity 45 of the ring 43. In this manner a considerable amount of the recess 42 is provided to the right side of the member 43 as viewed in FIGURE 3. Between the wall portion 47 of the body member 39 and the backing ring 43 is positioned a floating metal seal 48 having a bottom wall 49 which runs between a fulcrum point 50 at the point of engagement of the member 48 with the wall 47 and the flat terminus of the seal member 48 at the point of contact 51 with the backing ring 43. The bottom wall 49 of the seal 48 is integral with the arcuate section 52 which extends upwardly as viewed in FIGURE 3 into a straight, substantially vertical section before reversely curving upon itself in a looped section at 53 to provide an upward sealing surface portion 54. It will be noted that, as in FIGURE 2, the valve disc 10 engages the sealing surface 54 in a tangential point contact relationship at the point 55. As in the case of the backing ring 23 of FIGURE 2, the flat backing ring 43 is preselected in design to place the wall section 49 of the seal 48 under a slight spring bias whereby to assure a complete seal during operations of the valve. Likewise as in the form of FIGURE 2 the spring bias of the ring 43 is not so great as to prevent, but rather permit radial shifting of the seat member 48 within the confines of the recess 42 of the valve assembly.

During the operation of the valve illustrated in FIGURE 3 fluid under pressure from the right as viewed in the drawing will act upon the right hand surfaces of the seal 48 and will tend to pivot the seal 48 about the tangential contact point 50 whereby to place the contact point 51 of the lower wall 49 into a more firm sealing arrangement with the backing ring 43. It is obvious therefore that upon the application of pressure to the valve that at all points 55, 50, 51 and the point contact between the portion 45 of the ring 43 and the boss 46 of the ring 43, the likelihood of sealing effectively will be increased, and the danger of leakage upon increased pressures will be greatly diminished if not entirely eliminated.

Referring to the modification of the invention illustrated in FIGURE 4 there is shown a valve disc 10 carried by an operating shaft 11 within the general confines of housing portions 56 and 57 which are joined together along a threaded joint 58. The body portions 56 and 57 as in the previous forms of this invention, upon full threaded engagement, define a recess 59 having a pair of side walls 60 and 61 and a bottom wall 62. Seated along the bottom wall and therefore being of substantially the same diameter as the recess 59 is a resilient, substantially U-shaped backing ring member 63 having a relatively short substantially vertical leg 64 and a somewhat inclined vertical leg 65. It will be noted that the upper portion of the leg 65 is in substantially point contact with the wall 61 of the recess 59 at the point 66. Between the wall 60 of the recess 59 and the short vertical leg 64 of the ring 63 is the lower arcuate section 67 of a sealing seat member 68 for the valve assembly. The arcuate section 67 terminates in a flat edge engaging directly against the outer wall 64 of the seal 63 at the point 69. Integral with the arcuate section 67 is a reversely curved section 69 extending upwardly and into a second reversely curved or looped section 70, the upper surface 71 of which is designed to receive in substantially tangential point contact sealing relationship at the point 72 the valve disc 10. Operation of this form of the invention is somewhat similar to that of FIGURES 2 and 3 in that fluid pressure exerted from right to left as viewed in FIGURE 4 will tend to act on the looped section 70 as well as other portions of the seat 68 to pivot the seat member about the fulcrum point 73, the point of contact between the arcuate seal section 67 and the wall 60. In doing so a tight seal will be obtained between the point contacts 66, 69, 72 and 73. As in the other forms of the invention illustrated, the resiliency of the backing ring is such as to insure an initial light seal and biasing arrangement on the arcuate bottom wall area of the seat 68, such biasing action being insufficient to prevent a somewhat floating action for ease of radial shifting of the member 68 within the recess 59. In other words the seat is shiftable in accord with the opening and closing movements of the offset mounted valve disc 10. Likewise the seat 68 cooperating in the seat assembly with the backing ring 63 is designed to inherently compensate for varying expansion and contraction responses of the valve parts to large temperature gradients.

Now referring to FIGURE 5 and the modification of the invention illustrated therein, the valve body portions 74 and 75 are illustrated as being joined together along the threaded connection 76 to result in a built-in recess 77 having side walls 78 and 79 and a bottom wall 80. Within the recess 77 is a substantially U-shaped resilient metal backing ring 81 having a lower section engaging along the internal diameter of the recess as indicated by the contact with the lower wall 80 of the recess as viewed in FIGURE 5. The member 81 includes a substantially vertical leg 82 and an inclined leg 83 terminating in a point contact with the wall 79 at point 84. Between the leg 82 and the wall surface 78 is positioned the lower portion of a resilient pressure responsive metal seat member 85. The lower extremity of the seat 85 includes an arcuate portion 86 having a fulcrum point contact 87 with the wall 78, and includes a straight lower wall 88 having a ninety degree abutting contact at 89. From the arcuate section 86 the seat extends substantially vertically upward with a straight portion 90 and then is abruptly directed around a ninety degree curved section 91 to provide a downstream directed wall 92 which is integral with a looped portion 93 which reverses the seat upon itself to provide an upper seating surface 94. A valve disc 10 is illustrated as having a substantially tangential point contact at the point 95 with the surface 94. This construction of FIGURE 5 is somewhat similar to that of FIGURE 4 but is different therefrom in that the seat construction is such as to place most of the valve and the contact portion thereof at 95 with seat 10 downstream of the fulcrum point 87. In the form of FIGURE 4 the seating contact of the seat 68 with the valve 10 is almost vertically aligned with the fulcrum point. In the form of FIGURE 5 the seat contact is spaced considerably downstream and a fuller effect is given to the looped section 92 whereby pressure fluid coming from the right as viewed in FIGURE 5 will have a substantial pivoting effect upon the seat 85 whereby to obtain an efficient seal contact at the points 84, 87, 89 and 95. It will thus be seen that this form of the invention completely seals the upstream side of the valve from the downstream side by metal point contact to prevent pressure fluid leakage from the right-hand side of the body of the valve to the left-hand side while the disc 10 is in the closed or engaging position with the surface 94. As in the prior forms of the invention, the valve disc 10 upon closing will tend to shift the seat 85 somewhat radially as permitted by the resiliency of the backing ring 81, whereby the seat 85 may shift to accommodate and reseat itself with the member 10. Likewise as in the other forms of this invention, the details of the seat assembly including the ring 81 and the seat 85 are such as to place only a small amount of spring bias of the member 81 on the member 85 whereby to permit the radial shifting of the member 85 under operating conditions of the member 10. Likewise the construction, by use of the second part of the seat assembly, namely the backing ring 81, allows for varying expansion and contraction movements of the various valve assembly parts while still permitting the floating movement of the seat 85 in order to assure complementary action between the seat 10 and the member 85.

Referring now to FIGURE 6, a further form of the invention is illustrated in which the valve disc 10 carried by the shaft 11 is illustrated as being mounted within the body portions 96 and 97 of a valve assembly along the threaded connection 98. The construction of the members 96 and 97 is such that upon full engagement along the threads 98 a recess 99 is defined to accommodate a backing ring 100 and a valve seat 101. The recess 99 includes a bottom wall 102 and side walls 103 and 104. The backing ring 100 includes a substantially horizontal section 105 which is integral with an upwardly inclined leg 106 which terminates at 107 in point contact relationship with the wall 104 of the recess 99. Secured to the horizontal section 105 of the backing ring 100 is an added ring member 108 which is utilized for strengthening that section of the member 100 as well as for preventing the ring 100 from cocking within the recess 99. It will be noted that between the member 108 and the bottom wall 102 is a space 109 sufficient to permit radial shifting of the backing ring 100. Positioned above the section 105 of ring 100 is the lower wall 110 of a valve seat 101. At one end the wall 110 terminates in a downwardly and then upwardly directed arcuate section 111 which is in complementary engagement with the arcute portion 112 of the backing ring member 100. The other end of the bottom wall 110 terminates in an arcuate section 113 having a point contact 114 to define a pivotal or fulcrum point contact with the wall 103 of the recess 99. The arrangement is such that the backing ring 100 exerts a degree of resilient bias on the bottom wall secton 110 between the points 114 and 112. From the arcuate section 113 the valve seat 101 extends upwardly through a straight portion 115 thence about a ninety degree angle at 116 to form a downstream directed portion 117 terminating in a reversely directed loop 118 which, as viewed in FIGURE 6, terminates in a sealing surface 119 whereby the valve disc 10 upon contact with the surface 119 will have a substantially tangential point contact seating relationship at point 120 with the seat 101. In the operation of this form of the valve, upon a closing action of the disc 10 against the surface portions 119 of the seat 101, the entire seat assembly including the seat member 101 and the backing ring 100 will shift radially within the recess to obtain a complete and efficient sealing action along the point of contact 120 between the valve disc 10 and the seat 101. In other words the seat will adjust itself radially to accommodate the disc 10 in a complementary manner. Likewise the possibilities of non-conformity of the various parts under varying temperature conditions is obviated by the design wherein inaccuracies of manufacture or varying responses to temperature changes will be inherently compensated by the resiliency of the backing ring 100 and/or of the seat member 101. Therefore, when pressure fluid from the right as illustrated in FIGURE 6 is applied to the valve 10 it will also be applied to the looped area 118 and other portions of the ring 100 and seat 101 whereby to attempt to pivot the seat 101 about the fulcrum point 114 to effect a firm and efficient seal at the point 120 between the seat 101 and the valve member 10. Likewise the pressure will increase the sealing efficiency at points 114, 112 and 107 whereby form a substantially non-leak valve arrangement.

In summary then it should be apparent to one skilled in the art that the back-up ring in each form of the invention provides a flexible member which can be designed to a predetermined loading by the spring characteristics of the ring such that the body cavity can be controlled with greater tolerance and the seating element is allowed to align itself with the disc throughout the motion of the disc while retaining the predetermined load at the contact point between the seating member and the back-up ring. As the body cavity reduces due to the joining of the two housing portions the side of the back-up ring toward the body will deflect inward without unduly increasing the load against the seating member, and the surface of the back-up ring facing the seating member will retain its radial position independent of the flexing of the other side of the back-up ring. The material thickness and length of the back-up ring sections will be determined by the pressure operating characteristics of the valve system in which it will be used.

It will also be apparent to one skilled in the art that the utilization of a fulcrum point in each seat design has certain advantages as typified by FIGURE 2 where the disc becomes repositioned due to changes in manufacturing tolerances, the alignment of the seating member and the disc will change to match the position of the disc axially in the unit. As this occurs from one extreme to the other, the seating member will flex about the fulcrum point 28 within a few thousandths of an inch tolerance without materially affecting the seat 24 or the wall 25 of the seating member. The radius of section 29 will change to match the butterfly position. For diameters of the butterfly disc greater than the designed size, some flexing about the bend at wall 30 and loop 31 will occur to align the seat with the larger butterfly member. In the special case of all manufacturing tolerances being nominal, but the butterfly diameter being larger, the unit will also flex about the fulcrum 28 to achieve a new contact point of the disc member along the loop 31. Then as the butterfly rotates, the seal will be forced to move axially again about the fulcrum 28 in the same manner that it would have to move were the shaft 11 located at the extreme tolerance manufacturing wise. The sealing surface at fulcrum 28 will be unaffected by the radial movement of the seating member and the sealing surface at arcuate section 27 will also be unaffected because these surfaces are parallel and finished for the sealing along the full diameter. The predetermined loading of the seat will also be unaffected because the wall 25 and the back-up ring 23 are, for all practical purposes, unaffected by the flexing of the seating member to meet the differences in dimension due to manufacturing. These advantages as specified relative to FIGURE 2, apply to the forms of the invention in FIGURES 3 through 6 equally as well as to the form of FIGURE 2.

Obvious modifications of the two part seat assembly structure as disclosed by this invention such as would occur to one skilled in the art are deemed to be within the concepts presented herein and within the scope of the appended claims.

I claim:

1. A seat assembly for a butterfly valve including a passage and an annular body recess about the passage which comprises, a substantially U-shaped resilient backing ring, and a resilient metallic valve seat, said valve seat including a bottom wall terminating at either end in an arcuate section with one said section engaging in tangential point contact relationship with the backing ring and the other said arcuate section engaging a wall of the recess in point contact relationship, and said seat including a radially inwardly directed portion extending sufficiently inwardly of the valve passage and thence downstream of the passage to form a looped portion whereby the looped portion has an extension directed axially of the passage in an upstream direction so that pressure fluid engaging against the upstream side of the seat member will act upon the seat to pivot the seat about its arcuate point contact with the recess wall whereby to effectively seal the valve against leakage about the seat in the area of the body recess.

2. A seat assembly for a butterfly valve including a passage and an annular body recess with side and bottom walls about the passage which comprises, a resilient, metallic ring-shaped plate rigidly attached to the body in the bottom wall area of the recess and being spaced from the side walls of the recess, and a valve seat of resilient metal, said seat having an arcuate end section positioned between the plate and one side wall of the recess with the arc position of the section being in tangential contact with the recess side wall and the terminus of the seat being in flat, transverse abutting relationship with the plate, and said seat having a portion extending inwardly of the passage and being reversely curved upon itself to form an upper seating surface extending generally axially of the passage in the upstream direction of the valve.

3. A seat assembly for a butterfly valve including a passage and an annular body recess with side and bottom walls about the passage which comprises, a resilient, metallic backing ring of a substantially U-shaped cross-section, said ring including a first leg in a substantially vertical plane, a second leg being somewhat inclined to the vertical toward and engaging a recess side wall in point contact relationship, and a bridging wall connecting said legs and engaging the bottom wall of the recess, and a resilient metallic valve seat having a substantially axially directed seating surface extending upstream of the passage, said seat further having a portion which is multiply reversely curved upon itself and terminates in an arcuate section between the other recess side wall and the first leg of the ring with the section being in tangential point contact relationship with the side wall and the terminus edge of the seat abutting the first leg of the ring in a transverse point contact relationship so that the resiliency of the ring puts a predetermined axially directed bias on the arcuate section of the seat.

4. A seat assembly for a butterfly valve including a passage and an annular body recess about the passage which comprises, a substantially U-shaped backing ring and a valve seat, said valve seat having a bottom wall portion extending transversely of the recess from an arcuate section to a flat vertical terminus and being positioned between a defining surface of said recess and one leg of said U-shaped backing ring so that the flat terminus abuts the leg of the ring and being under a predetermined axially directed loading as derived from the inherent resilience of said backing ring, and said seat having a portion extending outwardly of the recess into the passage and thence downstream into an integral looped section wherein the seat material is reversed upon itself in a direction upstream of the valve body whereby, upon the application of fluid pressure to the valve body, the seat looped portion will pivot about the arcuate section within the recess to effectively seal the seat against the backing ring and the walls of the recess in point contact relationship.

5. A seat assembly for a butterfly valve including a passage and an annular body recess with side and bottom walls about the passage which comprises, a resilient, metallic backing ring having a first leg disposed transversely of the recess and a second leg integral with the transverse leg and formed at an obtuse angle thereto with the terminus of the second leg engaging a recess side wall in point contact relationship, said transverse leg including a strengthening ring connected thereto between and spaced from the recess bottom wall, and a resilient, metallic valve seat, said seat having a lower wall spaced from the first leg of the backing ring, said lower wall being integral at one end with a first arcuate section engaging a recess side wall and terminating at its other end in a second arcuate section engaging the backing ring at the juncture between the first and second legs, the resilience of the ring placing a predetermined bias on the lower wall of the seat and said seat structure extending inwardly of the passage from the first arcuate section to terminate in a reversely curved loop portion having a seating surface directed substantially axially and upstream of the valve passage.

6. A valve comprising a valve body with a through passage, said valve body including an annular recess, a valve seating assembly including a resilient valve seating ring and a resilient metallic backing ring, said seating ring having an arcuate body portion in frictional tangential point contact with a wall of said recess with clearance provided to permit transverse shifting of said entire seat within said passage, said resilient backing ring co-acting with a second wall of said recess and the terminus portion of said arcuate body portion to place a predetermined resilient bias on said seating ring, said seating ring further including a portion co-extensive with the arcuate portion extending first inwardly of the passage and then generally axially of the passage, a butterfly valve disc pivotally secured to the body within the passage, and operating shaft means connected to said disc for moving the disc between opening and closing positions, said frictional point contact providing the sole attachment between said seat and said valve body.

7. A resilient assembly for a butterfly valve including a passage and an annular body recess about the passage which comprises; a resilient metallic backing ring, and a resilient metallic valve seat, said valve seat including a bottom wall terminating in an arcuate section with said section engaging in tangential point contact relationship with a wall of the recess, said resilient backing ring co-acting with a second wall of said recess and the terminus portion of said arcuate section to place a predetermined resilient bias on said valve seat, and said seat further including a radially inwardly directed portion extending sufficiently inwardly of the valve passage and thence downstream of the passage to form a looped portion whereby the looped portion has an extension directed axially of the passage in an upstream direction so that the pressure fluid engaging against the upstream side of said member will act upon the seat to pivot the seat about its arcuate point contact with the recess wall, whereby to effectively seal the valve against leakage about the seat in the area of the body recess.

8. The invention according to claim 6 wherein the valve disk is mounted to pivot about an axis offset from the central axis of the passage, whereby upon engagement of the disk with the valve seat, the seat is bodily shifted to form a complete seal of the disk with the seat.

References Cited in the file of this patent

UNITED STATES PATENTS

| | | |
|---|---|---|
| 2,059,656 | Ring | Nov. 3, 1936 |
| 2,789,785 | Woods | Apr. 23, 1957 |
| 2,886,062 | Wheatley | May 12, 1959 |
| 2,892,609 | Bibbo | June 30, 1959 |
| 2,893,682 | Hintzman | July 7, 1959 |

FOREIGN PATENTS

| | | |
|---|---|---|
| 753,860 | Great Britain | Aug. 1, 1956 |